United States Patent [19]
Obana

[11] Patent Number: 5,911,675
[45] Date of Patent: Jun. 15, 1999

[54] STEEL CORD FOR REINFORCING RUBBER PRODUCT AND PNEUMATIC TIRE USING SUCH STEEL CORD

[75] Inventor: Naohiko Obana, Kuroiso, Japan

[73] Assignee: Bridgestone Corporation, Tokyo, Japan

[21] Appl. No.: 08/956,706

[22] Filed: Oct. 23, 1997

[51] Int. Cl.⁶ ............................. D02G 3/02; D02G 3/36
[52] U.S. Cl. ............................ 57/212; 57/311; 57/902; 152/451
[58] Field of Search ............................ 57/212, 311, 902, 57/210, 200, 206, 9; 152/527, 556, 451

[56] References Cited

U.S. PATENT DOCUMENTS

| | | |
|---|---|---|
| 5,020,312 | 6/1991 | Watakabe . |
| 5,295,346 | 3/1994 | Bundo et al. ............................ 57/236 |
| 5,319,915 | 6/1994 | Kobayashi et al. ..................... 57/200 |
| 5,337,549 | 8/1994 | Kobayashi et al. ..................... 57/236 |
| 5,584,169 | 12/1996 | Ikehara . |
| 5,606,852 | 3/1997 | Yanagisawa . |
| 5,616,197 | 4/1997 | Helfer et al. ............................ 152/527 |
| 5,661,966 | 9/1997 | Matsumara .............................. 57/902 |
| 5,707,467 | 1/1998 | Matsumara et al. ................... 152/527 |

FOREIGN PATENT DOCUMENTS

| | | |
|---|---|---|
| 0 462 716 A1 | 12/1991 | European Pat. Off. . |
| 0 551 124 A2 | 7/1993 | European Pat. Off. . |
| 0 566 350 A1 | 10/1993 | European Pat. Off. . |
| 0567334A1 | 10/1993 | European Pat. Off. . |
| 4-60589 | 5/1992 | Japan . |
| 5-295682 | 11/1993 | Japan . |
| WO95/16816 | 6/1995 | WIPO . |

*Primary Examiner*—John J. Calvert
*Assistant Examiner*—Tejash D Patel
*Attorney, Agent, or Firm*—Knobbe, Martens, Olson & Bear, LLP

[57] ABSTRACT

A steel cord for reinforcing a rubber product includes a core consisting of one steel filament and a sheath consisting of a plurality of steel filaments wound around the core. The steel filament of the core alternately having straight portions, whose axes of the straight portions are disposed on one line, and protrusions formed by bending. The peak of each protrusion is disposed outside of the sheath. The steel cord for reinforcing a rubber product is used in a pneumatic tire. The pneumatic tire includes a carcass having a crown portion and having a toroidal shape, a pair of beads over which the toroidal shape extends, a belt layer or belt layers for reinforcing the crown portion of the carcass, and rubber surrounding the carcass, the pair of bead, and the belt layer(s). The steel cord is used in the carcass and/or the belt layer(s).

16 Claims, 7 Drawing Sheets

STEEL CORD FOR REINFORCING RUBBER PRODUCT AND PNEUMATIC TIRE USING SUCH STEEL CORD

BACKGROUND OF THE INVENTION

1. Field of the Invention

The present invention relates to a steel cord for reinforcing a rubber product, having good penetration of rubber and high rigidity, and to a pneumatic tire having improved durability, steering stability and uniformity through the use of this steel cord as a reinforcing member.

2. Description of the Related Art

In the field of steel cords for reinforcing rubber products such as tires, steel cords into which an elastic material such as rubber can penetrate have been proposed in order to improve the durability of rubber products reinforced by the steel cords.

For example, as shown in FIG. 5, an open cord 100 has been proposed which is composed of filaments 102 twisted together in large spirals with gaps 104 therebetween in order to permit penetration of rubber into the cord 100.

However, the open cord 100 has drawbacks caused by its low rigidity due to the filaments 102 being twisted together in large spirals. For example, it is difficult to maintain good uniformity of tires when the open cord 100 is used, because the open cord 100 can easily elongate under a low tensile load such as that applied to the cord in the production process of tires.

Further, another drawback of the open cord 100 is that the penetration of rubber is unreliable because the filaments 102 can easily be made to contact each other due to the tension or compression which arises in the production process of rubber products such as tires.

In order to overcome such drawbacks of the open cord, various steel cords have been proposed.

For example, a steel cord, which comprises at least one filament having a spiral shape prior to twisting with other filaments and in which these filaments are twisted together such that the twisting pitch of the steel cord is larger than the spiral pitch of said at least one filaments, is disclosed in Japanese Utility Model Application Laid-Open (JP-U) No. 4-60589. Further, a 1+3 structure in which the core filament 114 has a continuous wave shape (FIG. 6) is disclosed in Japanese Patent Application Laid-Open (JP-A) No. 5-295682.

These steel cords have higher rigidity and exhibit more reliable penetration of rubber than the open cord, and can overcome the drawbacks of the open cord to a certain extent. However, the improvement is not enough to provide excellent steering stability and uniformity for tires, and thus, further improvement are required.

SUMMARY OF THE INVENTION

The present invention has been made in light of the above circumstances, and an object thereof is to provide a steel cord for reinforcing a rubber product having higher rigidity and more reliable penetration of an elastic material such as rubber.

Another object is to provide a pneumatic tire with improved durability, steering stability and uniformity.

A steel cord for reinforcing a rubber product according to the present invention comprises a core consisting of one steel filament and a sheath consisting of a plurality of steel filaments wound around the core, with the steel filament of the core alternately having straight portions, whose axes are disposed on one line, and protrusions formed by bending.

A pneumatic tire according to the present invention comprises a carcass having a crown portion and having a toroidal shape, a pair of beads over which said toroidal shape extends, at least one belt layer for reinforcing said crown portion of said carcass and rubber surrounding said carcass, said pair of beads, and said at least one belt layer, and the above-described steel cord for reinforcing a rubber product is used in at least one of the carcass and the belt layer.

The feature of the steel cord of the present invention is the shape of the filament of the core (hereinafter called "core filament"), that is, the core filament should alternately have straight portions, whose axes are disposed on one (a single) line, and protrusions formed by bending.

According to the present invention, the protrusions of the core filament prevent the filaments of the sheath (hereinafter called "sheath filaments) from contacting each other due to the tension or compression which arises in the production process of rubber products such as tires, and thus, penetration of rubber is ensured.

Moreover, because the core filament has straight portions disposed on one (a single) line parallel to the axis of the cord, steel cord of the present invention exhibits high rigidity and low elongation when a tensile load is applied thereto.

Therefore, the steel cord of the present invention can provide superior durability, steering stability and uniformity for a tire using the steel cord.

DESCIPTION OF THE PREFERRED EMBODIMENTS

Figure 2:
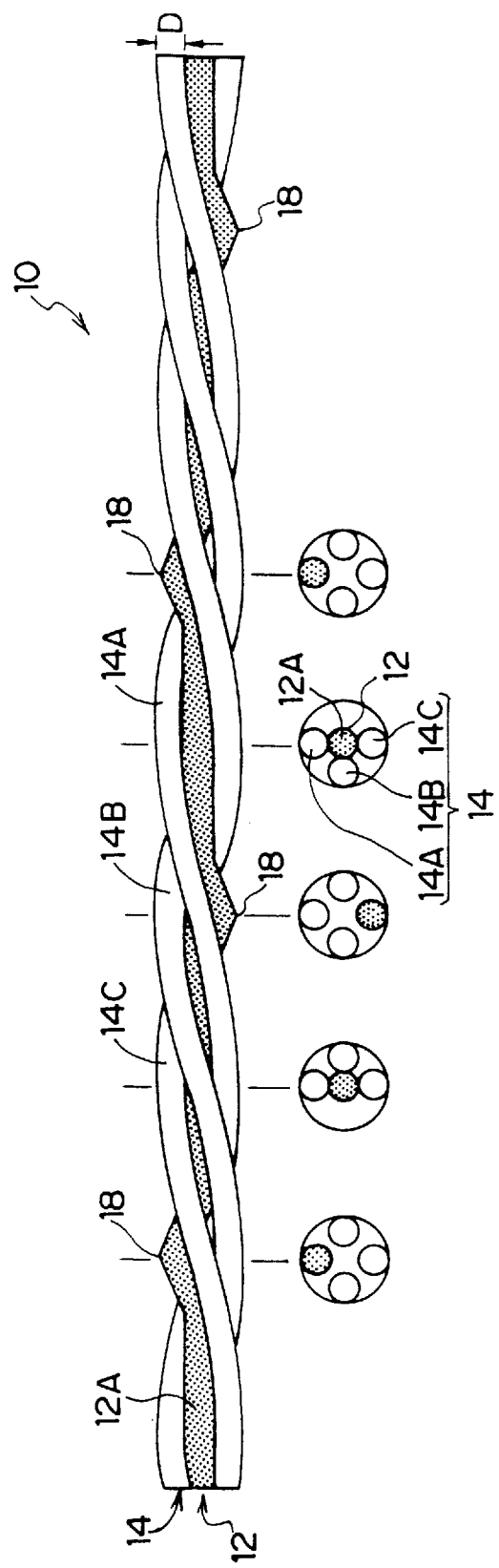
FIG. 2 illustrates an embodiment of a steel cord of the present invention having the core filament shown in FIG. 1.

FIG. 2 shows a steel cord 10 of the present invention. The steel cord 10 comprises a core filament 12 and a sheath 14. The sheath 14 is comprised of three sheath filaments 14A, 14B and 14C. The diameter, d, of the core filament 12 is the same as the diameter, D, of each sheath filament 14A, 14B or 14C.

Figure 1:
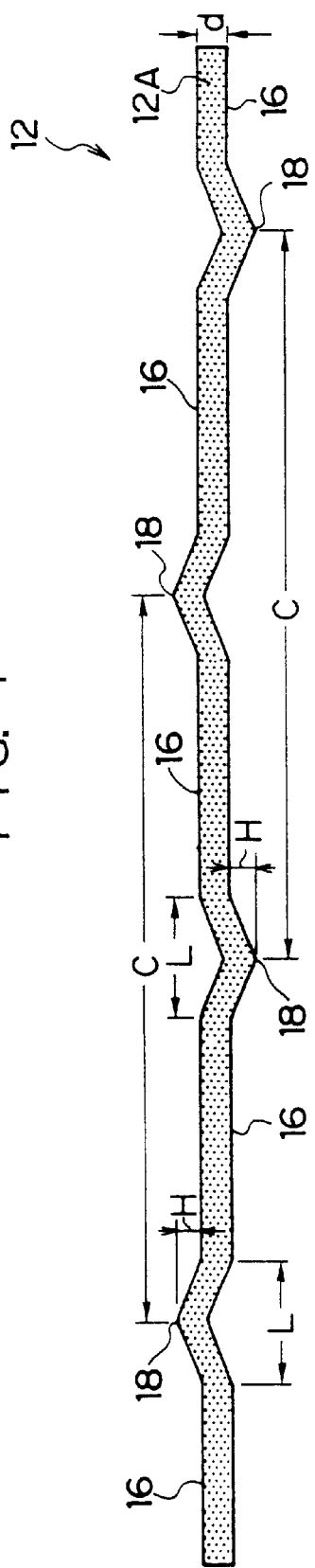
FIG. 1 is a side view of an example of a core filament used in a steel cord of the present invention.

FIG. 1 shows the core filament 12. The core filament 12 alternately has straight portions 16, whose axes are disposed on one line, and protrusions 18 formed by bending. The length of each straight portion 16 is the same and the length of each protrusion 18 is the same in the longitudinal direction of the core filament 12. The adjacent protrusions 18 are formed so that the direction of the tops of these protrusions 18 are opposite to each other. Each of the protrusions 18 has the same height, which is a height sufficient to allow each protrusion 18 to be interposed between any two of the sheath filaments 14A, 14B and 14C.

The sheath filaments 14A, 14B and 14C are wound around the core filament 12 so that the twisting pitch of the sheath filaments 14A, 14B and 14C is substantially the same as the length between adjacent protrusions 18 which are disposed on the same side of the core filament 12, as shown in FIG. 2.

It is preferable that the steel cord 10 satisfies the following formulas (1) to (3).

$$0.1D \leq H \leq D \quad (1)$$

$$0.14P \leq L \leq 0.2P \quad (2)$$

$$0.95P \leq C \leq 1.05P \quad (3)$$

In the above formulas, as shown in FIG. 1, H is the height of each protrusion 18 in the direction perpendicular to the longitudinal direction of the core filament 12 and L is the length of each protrusion 18 in the longitudinal direction of the core filament 12, and P is the twisting pitch of the sheath 14, and C is the distance between adjacent protrusions 18 which are disposed on the same side of the core filament 12.

The reason for this is as follows: when H is less than 0.1D, the protrusions 18 are barely interposed between two of the sheath filaments 14A, 14B and 14C when the sheath filaments 14A, 14B and 14C are wound around the core filament 12. As a result, rubber penetrates into the steel cord 10 less reliably. In contrast, when H exceeds D, the steel cord 10 becomes too large and the thickness of the rubber which covers the steel cord 10 must be increased, resulting in increase in weight of the rubber product.

In addition, when L is less than 0.14P, it is difficult to form protrusions 18 which are large enough to be interposed between two of the sheath filaments 14A, 14B and 14C. However, when L exceeds 0.2P, the protrusions 18 become too large, and the effect of reducing elongation of the steel cord 10 under low tensile load due to the existence of the straight portion 16 deteriorates.

The effect of reducing elongation under tensile load also deteriorates when the distance C between adjacent protrusions 18 which are disposed on the same side of the core filament 12 is shortened. However, when the distance C is too large, the tensile stress generated in the core filament 12 by tensile load applied to the steel cord 10 exceeds the tensile stress in the sheath filaments 14A,14B and 14C. This may cause earlier breakage of the core filament 12 under repetitive load, such as a load which is generated in a rolling tire, resulting in undesirable degradation of fatigue resistance of a rubber product reinforced by the steel cord 10. Therefore, it is preferable that distance C is almost same as the twisting pitch P and satisfies $0.95P \leq C \leq 1.05P$.

In the present invention, it is preferable that the length of each straight portion 16 is more than 30% of the twisting pitch P of the sheath 14.

In the present invention, each straight portion 16 can have a different length. Similarly, each protrusion 18 can have a different length and a different height. However, it is preferable that the length of each straight portion 16 is the same and that each protrusion 16 has the same length and the same height. This makes production easier.

In addition, each filament, that is, the core filament 12 or the sheath filament 14A, 14B or 14C, can have a different diameter. However, it is preferable from the standpoint of productivity that each filament has the same diameter. In this case, the number of sheath filaments is preferably 2 to 4 in order to maintain gaps between adjacent filaments even when all of the sheath filaments come into contact with the core filament.

Further, the protrusions 18 may be formed on the same side or on all sides of the core filament 12. However, it is preferable that adjacent protrusions 18 are formed on opposite sides of the core filament 12, because it is easy to produce such a core filament and it is undesirable for open gaps to collect on only one side of the core filament 12.

Moreover, though each protrusion 18 shown in FIG. 1 is formed by angular bending portions, the protrusions used in the present invention can be any shape provided that the protrusions can be interposed between the sheath filaments 14A, 14B and 14C. Therefore, protrusions formed by curved bending portions can be used in the present invention.

Figure 3:
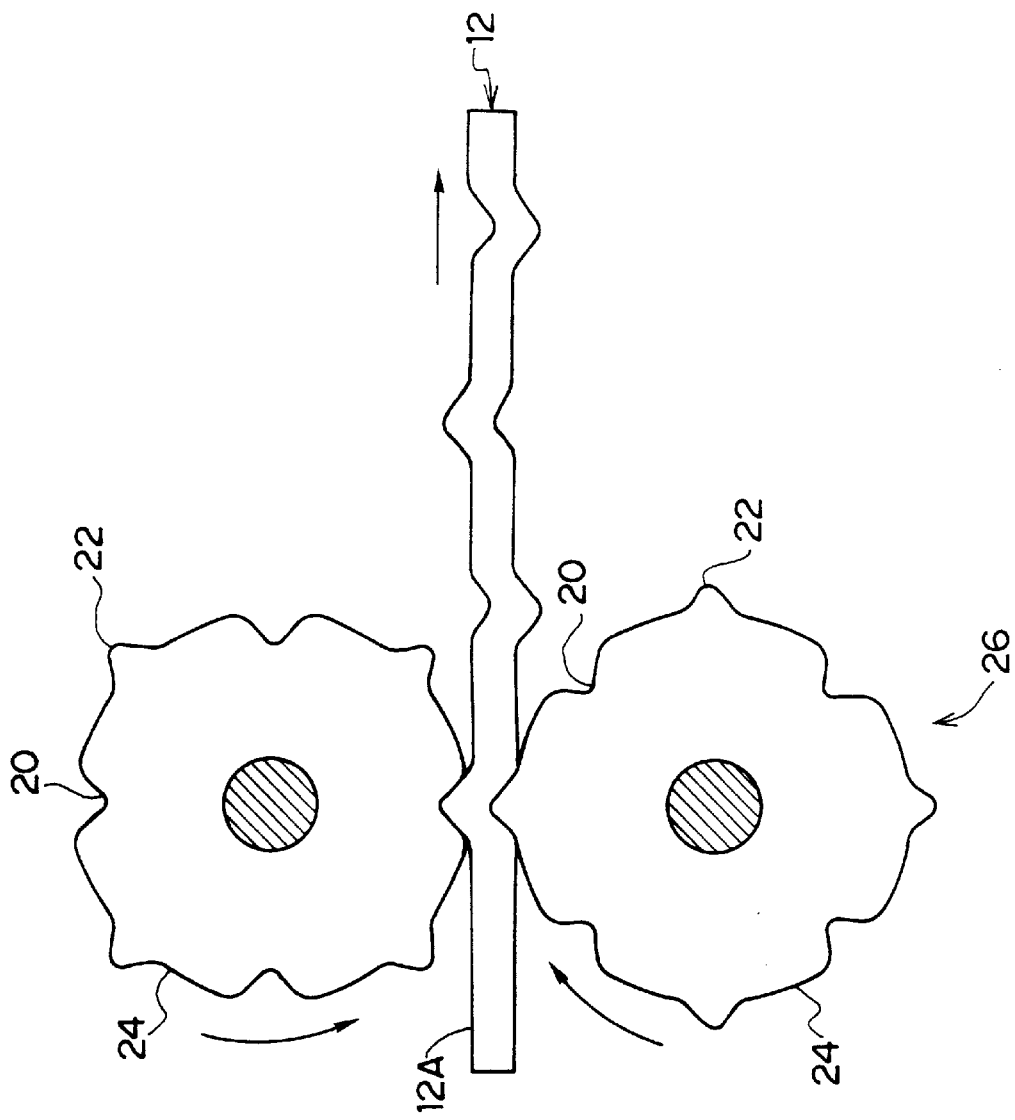
FIG. 3 schematically shows a side view of a device for forming the core filament shown in FIG. 1.

For the production of the core filament 12, a forming device 26 shown in FIG. 3 can be used. The forming device 26 includes a pair of forming rollers 24 on the periphery of which concave portions 20 and convex portions 22 are provided. The core filament 12 can be prepared by supplying a filament from a bobbin of a twisting machine (not shown) to the pair of forming rollers 24, and passing the filament between the pair of forming rollers 24 to bend it by the engagement of concave portion 20 and convex portion 22, as shown in FIG. 3, for the preparation of the protrusions 18. The sheath filaments 14A, 14B and 14C will be wound around the core filament 12 thus obtained to form the steel cord 10.

The steel cord 10 can be used in parts of tires, such as a carcass, a belt layer and the like.

Test Examples

In order to assess the effect of the present invention, examples according to the invention and comparative examples, as shown in Table 1, were prepared. Each steel cord shown in Table 1 was composed of four filaments each having a diameter of 0.26 mm. Moreover, the steel cords in Table 1 had the same twisting pitch of 12.0 mm.

Figure 5:
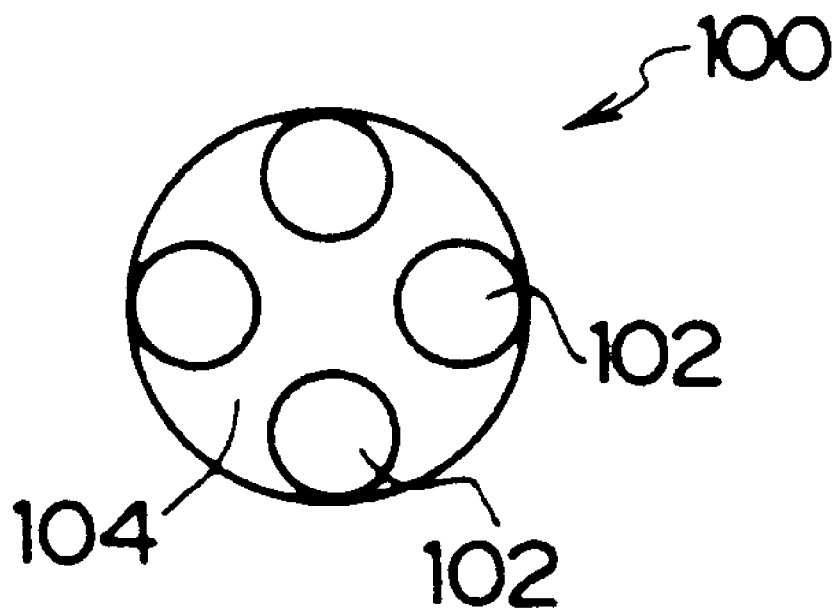
FIG. 5 is a cross-sectional view of a conventional steel cord having an open structure.

Comparative Example 1 had a 1×4 open structure having open gaps between adjacent sheath filaments as shown in FIG. 5.

Figure 6:
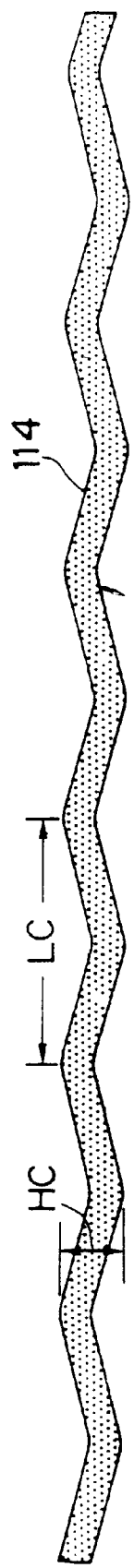
FIG. 6 is a side view of a core filament having a continuous wave form and used in another conventional steel cord.
Figure 7:
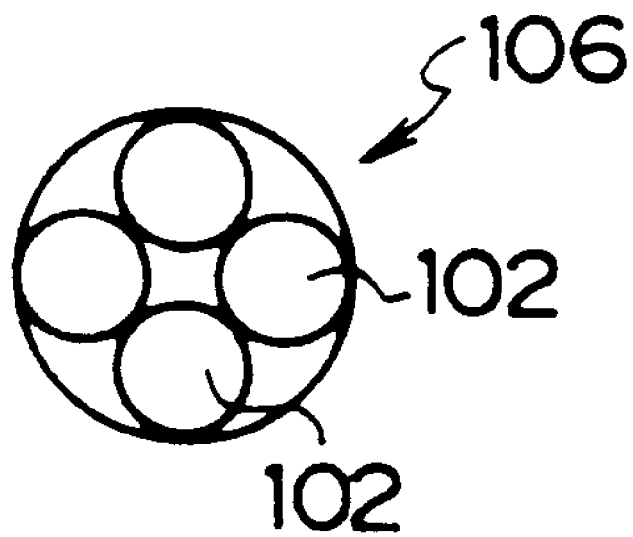
FIG. 7 is a cross-sectional view of another conventional steel cord having a closed structure.

Comparative Example 2 had a conventional 1×4 closed structure having no open gaps between adjacent sheath filaments as shown in FIG. 7. Further, Comparative Example 3 had a 1+3 structure with the core filament having a continuous wave form as shown in FIG. 6.

Examples 1 to 4 were steel cords according to the present invention (FIG. 2) and had a core filament alternately having straight portions, whose axes were disposed on one line, and protrusions formed by bending as shown in FIG. 1. In each core filament of Examples 1 to 4, the adjacent protrusions were disposed on opposite sides of the core filament, the length of each straight portion was the same, the length of each protrusion was the same, and the height of each protrusion was the same. In Example 1, the length L of each protrusion and the distance C between the adjacent protrusions which were disposed on the same side of the core filament were within the respective preferred ranges, but the height H of each protrusion was larger than the upper limit of the preferred range of H. In Example 2, the height H and the distance C were within the respective preferred ranges, but were the smallest among Examples 1 to 4. In addition, the length L fell outside of the preferred range of L in Example 2. In Example 3, the height H and the length L were within the respective preferred ranges, but the distance C was longer than the upper limit of the preferred range of C and about twice as long as the length of the twisting pitch of the sheath. Example 4 satisfied the above three conditions.

Figure 4:
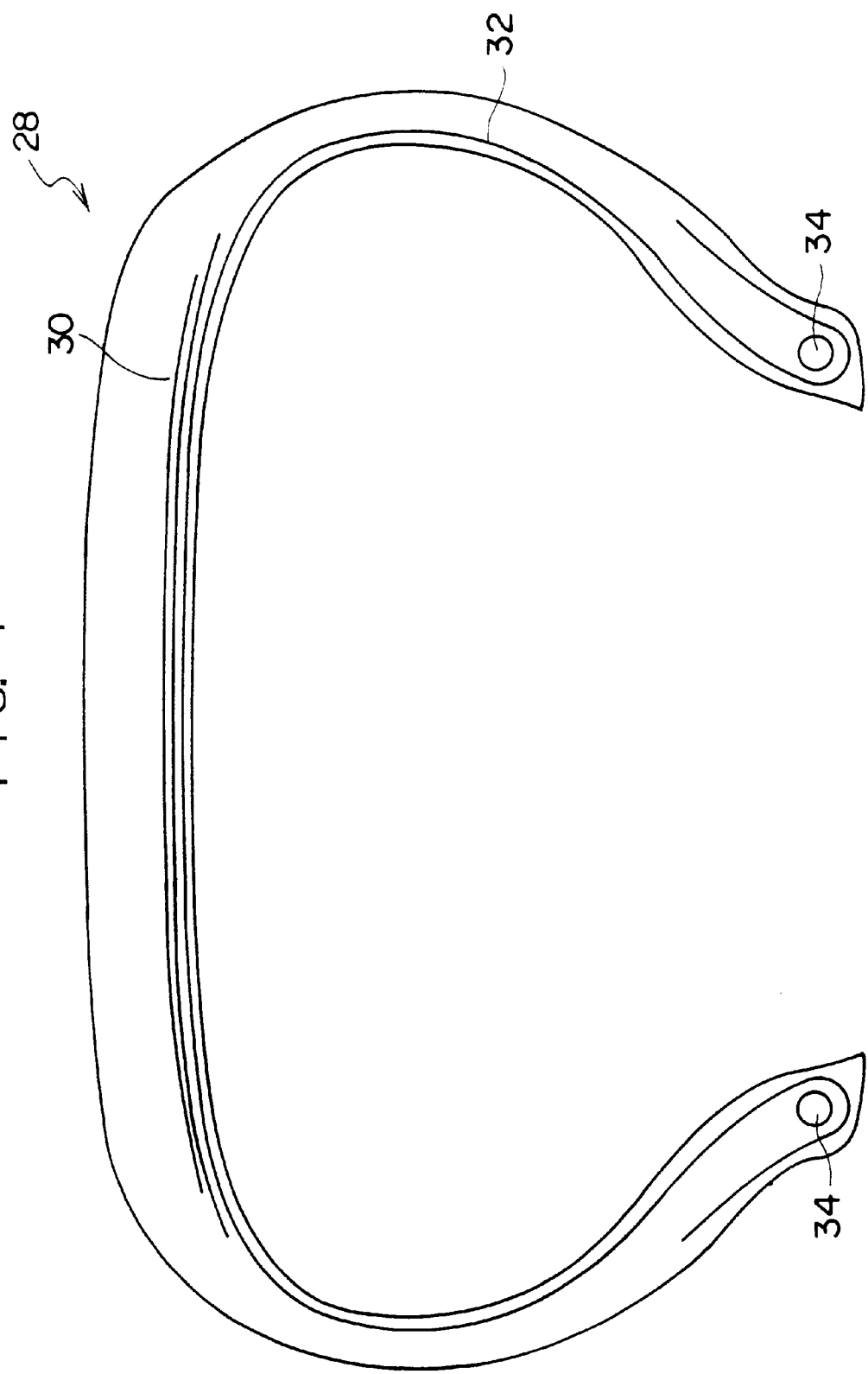
FIG. 4 is a cross-sectional view of a pneumatic tire of the present invention.

Tires (tire size: 205/R15) of the present invention were prepared. As shown in FIG. 4, each tire 28 comprised a carcass 32 having a toroidal shape extending over a pair of beads 34, and two belt layers 30 reinforcing the crown portion of the carcass 32, and one type of the above steel cords was used in the belt layers 30. The belt layers 30 comprised a plurality of steel cords which were parallel to each other. The steel cords of each of the belt layers 30 were set at an angle of 20 degrees with respect to the equatorial plane of the tire 28. Further, the two belt layers 30 were disposed so that the axes of the steel cords of one of the belt layers 30 intersected the axes of the steel cords of the other belt layer 30.

Test items are as follows:

(1) Elongation under low tensile load

Increase in elongation of the steel cord was measured when tensile load on the cord was increased from 0.5 kg to 5 kg. This parameter is commonly known as "Part Load Elongation (P.L.E.)" A small value is desirable for this parameter. In Table 1, the test results are expressed by relative values when the value of Comparative Example 2 is set at 100.

(2) Penetration of rubber

A piece of steel cord was sampled from the belt layer of each vulcanized tire, and the cross-sectional area of the cord over the entire length thereof was observed over every 1 mm. In Table 1, the result is expressed by "A" if, at every twisting pitch of the sheath, there were one or more cross-sectional areas at which the rubber penetrated all the gaps. Then, rather than observing the cross-sectional areas per twisting pitch, cross-sectional areas over respective sets of five pitched were observed. For example, the first set of five pitches were the first through fifth pitches of the steel cord, the second set was the second through sixth pitches, and the last set of five pitches was the pitches X−4, X−3, X−2, X−1, X, wherein X represent the final twisting pitch of the steel cord. The steel cord was given the evaluation mark B if there were one or more cross-sectional areas with full penetration of rubber in each set of five twisting pitches. The steel cord was given the evaluation mark C if there was at least one set of five twisting pitches in which there were no cross-sectional areas at which rubber penetrated all the gaps. The result "B" is acceptable in practical use.

(3) Uniformity of tire

A belt layer was sampled from each tire and the arrangements of the steel cords in the belt layer were evaluated by observing an X-ray transmission image. The uniformity of the arrangement of the steel cord in Comparative Example 1, with a 1×4 open structure, was worst and expressed by "C" in Table 1. In Comparative Example 3 with a 1+3 structure and a core filament having a continuous wave form, the result was better than that of Comparative 1 and expressed by "B". The two results were used as criteria and, as for other samples, if the result was similar to that of Comparative Example 1 or 3, it is expressed by "C" or "B" and if the result was better than that of Comparative Example 3, it is expressed by "A".

(4) Resistance to separation caused by cut of the tread

After running 50,000 km on a rough road, it was determined whether there was a cut which was formed in the tread and which reached the steel cord embedded in the belt layer. If there was such a cut, the maximum length of the corroded portion of each filament caused by the cut was measured. The shorter the maximum length of the corrosion, the better the resistance to separation caused by cut of the tread. The result of Comparative Example I was the best and is expressed by "A" in Table 1. On the other hand, the result of Comparative Example 2 was the worst and is expressed by "C". The two results are used as criteria and, as for other samples, if the result was similar to that of Comparative Example 1 or 2, it is expressed by "A" or "C" and if the result was better than that of Comparative Example 2 and was worse than that Comparative Example 1, it is expressed by "B". The result "B" is acceptable in practical use.

The results are shown in Table 1.

TABLE 1

|  | Comp. Ex. 1 | Comp. Ex. 2 | Comp. Ex. 3 | Ex. 1 | Ex. 2 | Ex.3 | Ex. 4 |
| --- | --- | --- | --- | --- | --- | --- | --- |
| Cord Structure | 1 × 4 × 0.26 | 1 × 4 × 0.26 | 1 + 3 × 0.26 | 1 + 3 × 0.26 | 1 + 3 × 0.26 | 1 + 3 × 0.26 | 1 + 3 × 0.26 |
| Twisting Pitch P of Sheath (nm) | 12.0 | 12.0 | 12.0 | 12.0 | 12.0 | 12.0 | 12.0 |
| Core Crimped Wave Height HC (mm) | — | — | 0.35 | — | — | — | — |
| Core Crimped WaveLength LC (mm) | — | — | 3.0 | — | — | — | — |
| Height H of Each Protrusion (mm) | — | — | — | 0.27 | 0.04 | 0.22 | 0.24 |
| Length L of Each Protrusion (mm) | — | — | — | 2.2 | 1.5 | 2.0 | 2.0 |
| Distance C between Adjacent Protrusions which are disposed on the same side of the core filament (mm) | — | — | — | 12.3 | 11.7 | 23.4 | 12.0 |
| Cord Diameter (mm) | 0.81 | 0.63 | 0.87 | 0.80 | 0.78 | 0.78 | 0.78 |
| Elongation under Low Tensile Load (Index Number) | 510 | 100 | 140 | 123 | 108 | 112 | 119 |
| Penetration of Rubber | A | C | A | A | B | B | A |
| Uniformity of Tire | C | A | B | A | A | A | A |
| Resistant to Separation Caused by Cut of the Tread | A | C | A | A | B | B | A |
| Reference Drawing | FIG. 5 | FIG. 7 | FIG. 6 | FIG. 2 | FIG. 2 | FIG. 2 | FIG. 2 |

Comp. Ex. = Comparative Example
Ex. = Example

As shown in Table 1, the amounts of elongation under low tensile load (P.L.E.) of the steel cords of Examples 1 to 4 are smaller than those of both Comparative Examples 1 and 3, and are similar to that of Comparative Example 2. Further, the results of uniformity of tires of Examples 1 to 4 are as good as that of Comparative Example 2, owing to their good workability and stable form.

In addition to the good characteristics of elongation under low tensile load, Examples 1 to 4 show good penetration of rubber, and the tires using these steel cords shows good resistance to separation caused by cut of the tread, which was not achieved by Comparative Example 2.

Further, the diameters of the steel cords of Examples 1 to 4 were much smaller than that of Comparative Example 3 which showed reasonable results for all the parameters evaluated except for P.L.E. As a result, the thickness of the belt layer comprising the steel cords of any type of Comparative Examples 1 to 4 were thinner than that comprising the steel cord of Comparative Example 3, resulting in lighter tires.

Among Examples 1 to 4, Example 4 which satisfied all the preferred conditions showed the best compatibility for parameters evaluated.

What is claimed is:

1. A steel cord for reinforcing a rubber product, comprising a core steel filament having straight portions and protrusions formed alternately along the core steel filament, and a group of spirally-shaped sheath steel filaments defining an area circumscribed by the spirally-shaped sheath steel filaments;

wherein the straight portions are disposed on one line within the area circumscribed by the group of spirally-shaped sheath steel filaments, each of the protrusions of the core steel filament is formed by bending the core steel filament in a plane to have a peak having a height measured radially outwardly from the surface of the straight portion, and the peak of each protrusion is disposed outside of the area circumscribed by the group of spirally-shaped sheath steel filaments.

2. A steel cord for reinforcing a rubber product according to claim 1, wherein the protrusions are disposed on alternately opposite sides of the core steel filament.

3. A steel cord for reinforcing a rubber product according to claim 2, wherein all of the straight portions have the same length, and all of the protrusions have the same length in the longitudinal direction of the core steel filament, and the diameter of the core steel filament is the same as that of each sheath steel filament of the group of spirally-shaped sheath steel filaments.

4. A steel cord for reinforcing a rubber product according to claim 3, wherein each sheath steel filament has a diameter D, each protrusion has a peak having a height H measured radially outwardly from the surface of the straight portion, each protrusion has a length L in the longitudinal direction of the core steel filament, a distance between peaks of adjacent protrusions disposed on the same side of the core steel filament is C, and the group of spirally-shaped sheath steel filaments has a spiral pitch P, wherein $0.1D \leq H \leq D$, $0.14P \leq L \leq 0.2P$, $0.95 \leq C \leq 1.05P$.

5. A steel cord for reinforcing a rubber product according to claim 4, wherein the number of sheath steel filaments of the group of spirally-shaped sheath steel filaments is two to four, and the sheath steel filaments contact the straight portions of the core steel filament.

6. A steel cord for reinforcing a rubber product according to claim 1, wherein all of the straight portions have the same length, and all of the protrusions have the same length in the longitudinal direction of the core steel filament.

7. A steel cord for reinforcing a rubber product according to claim 1, wherein the diameter of the core steel filament is the same as that of each sheath steel filament of the group of spirally-shaped sheath steel filaments.

8. A steel cord for reinforcing a rubber product according to claim 7, wherein the number of sheath steel filaments of the group of spirally-shaped sheath steel filaments is two to four.

9. A pneumatic tire comprising:

a carcass having a crown portion and having a toroidal shape;

a pair of beads over which said toroidal shape extends;

at least one belt layer for reinforcing said crown portion of said carcass;

wherein at least one of said carcass or said at least one belt layer comprises a steel cord for reinforcing a rubber product, said steel cord comprising a core steel filament having straight portions and protrusions formed alternately along the core steel filament and a group of spirally-shaped sheath steel filaments, the straight portions being disposed on one line within the area circumscribed by the group of spirally-shaped sheath steel filaments, each of the protrusions of the core steel filament being formed by bending the core steel filament in a plane to have a peak having a height measured radially outwardly from the surface of the straight portion, and the peak of each protrusion being disposed outside of the area circumscribed by the group of spirally-shaped sheath steel filaments.

10. A pneumatic tire according to claim 9, wherein the protrusions are disposed on alternately opposite sides of the core steel filament.

11. A pneumatic tire according to claim 10, wherein all of the straight portions have the same length, and all of the protrisions have the same length in the longitudinal direction of the core steel filament, and the diameter of the core steel filament is the same as that of each sheath steel filament of the group of spirally-shaped sheath steel filaments.

12. A pneumatic tire according to claim 11, wherein each sheath steel filament has a diameter D, each protrusion has a peak having a height H measured radially outwardly from the surface of the straight portion, each protrusion has a length L in the longitudinal direction of the core steel filament, a distance between peaks of adjacent protrusions disposed on the same side of the core steel filament is C, and the group of spirally-shaped sheath steel filaments has a spiral pitch P, wherein $0.1D \leq H \leq D$, $0.14P \leq L \leq 0.2P$, $0.95 \leq C \leq 1.05P$.

13. A pneumatic tire according to claim 9, wherein all of the straight portions have the same length, and all of the protrusions have the same length in the longitudinal direction of the core steel filament.

14. A pneumatic tire according to claim 9, wherein the diameter of the core steel filament is the same as that of each sheath steel filament of the group of spirally-shaped sheath steel filaments.

15. A pneumatic tire according to claim 14, wherein the number of sheath steel filaments of the group of spirally-shaped sheath steel filaments is two to four.

16. A pneumatic tire according to claim 5, wherein at least said at least one belt layer comprises said steel cord for reinforcing a rubber product.

* * * * *